United States Patent [19]

Milberger et al.

[11] 4,187,458
[45] Feb. 5, 1980

[54] CONSTANT POWER REGENERATIVE MAGNETIC SWITCHING REGULATOR

[75] Inventors: Walter E. Milberger, Severna Park, Md.; Larry G. Wright, Salisbury, N.C.

[73] Assignee: The United States of America as represented by the Secretary of the Army, Washington, D.C.

[21] Appl. No.: 931,356

[22] Filed: Aug. 7, 1978

[51] Int. Cl.² .................. H02M 3/335; G05F 1/56
[52] U.S. Cl. .................. 323/17; 323/DIG. 1; 363/25
[58] Field of Search .................. 323/17, DIG. 1; 363/24–26, 124, 133, 134

[56] References Cited

U.S. PATENT DOCUMENTS

| | | | |
|---|---|---|---|
| 3,161,837 | 12/1964 | Lloyd | 363/133 X |
| 3,350,620 | 10/1967 | Barron | 363/24 |
| 3,551,777 | 12/1970 | Bingley | 323/DIG. 1 |
| 3,621,331 | 11/1971 | Barron | 323/DIG. 1 |
| 3,735,235 | 5/1973 | Hamilton et al. | 363/26 |
| 3,914,680 | 10/1975 | Hesler et al. | 363/133 X |
| 4,062,057 | 12/1977 | Perkins et al. | 363/25 X |

Primary Examiner—A. D. Pellinen
Attorney, Agent, or Firm—Nathan Edelberg; Robert P. Gibson; Freddie M. Bush

[57] ABSTRACT

A switching regulator capable of performing open-loop functions. The inherent nature of the circuit provides a constant power translation regulator with short circuit dropout protection. Normal voltage or current regulation may be obtained by utilizing a control winding provided for that purpose. A free-running or locked blocking oscillator circuit in combination with a pulse width controlled switching regulator sustains its own drive and regulation functions. Measured efficiencies from 90 to 99 percent are obtainable with both resistive and line modulator type loads.

5 Claims, 9 Drawing Figures

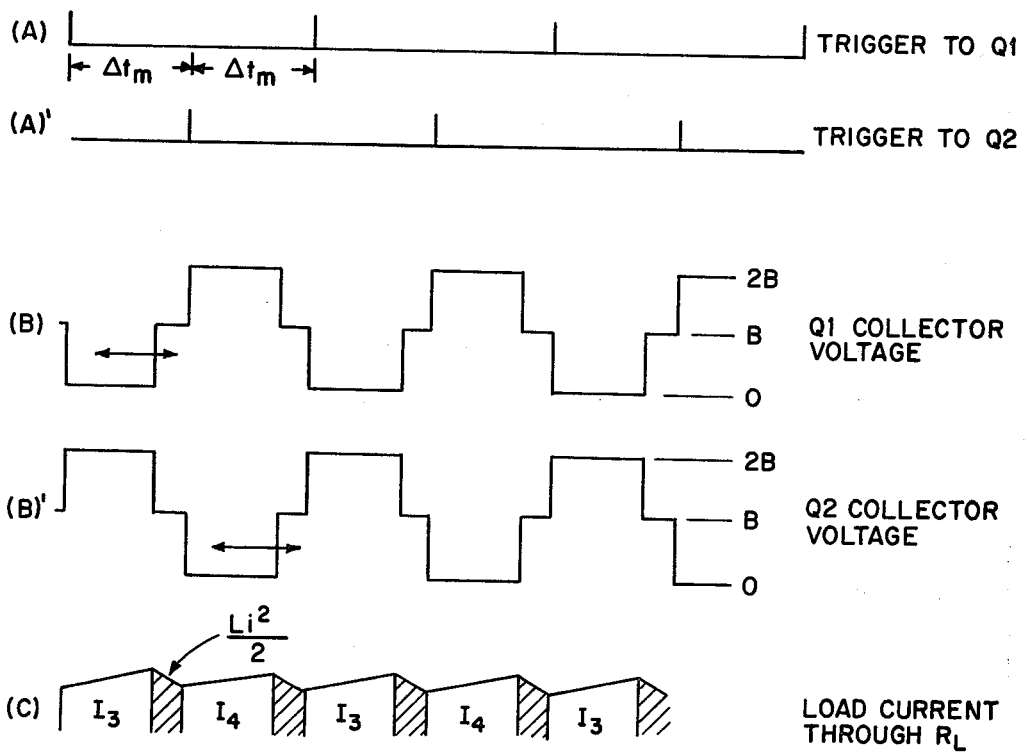
FIG. 6
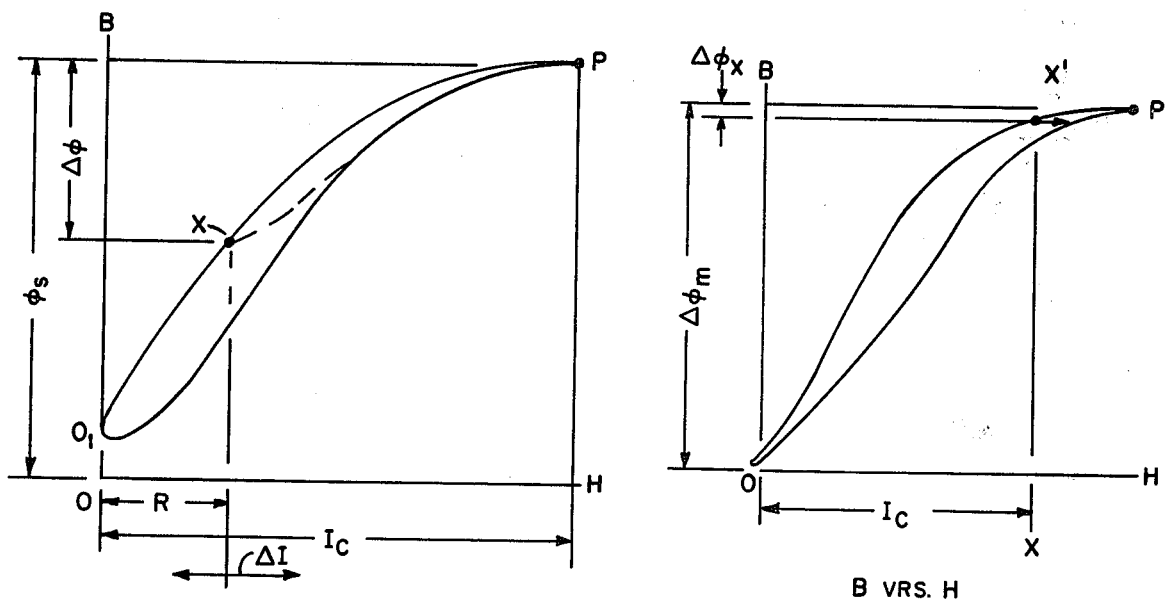
FIG. 3
FIG. 7

CONSTANT POWER REGENERATIVE MAGNETIC SWITCHING REGULATOR

DEDICATORY CLAUSE

The invention described herein was made in the course of or under a contract or subcontract thereunder with the Government and may be manufactured, used, and licensed by or for the Government for governmental purposes without the payment to us of any royalties thereon.

SUMMARY OF THE INVENTION

A constant power regenerative magnetic switching regulator is obtained with a free-running or blocking oscillator circuit in combination with a transformer to convert a voltage source to a constant power source as referred to the load circuit. The switching regulator performs open-loop functions that have been previously attainable only by complex closed-loop systems. The switching regulator has particular impact in the field of high powered laser power supplies where high efficiencies are required. The power regulation capability may also be used for electric arc welding, electrical ignitions or any other application requiring the charge of a capacitive load.

BRIEF DESCRIPTION OF THE DRAWINGS

FIG. 3 is a typical B-H curve for the embodiment of FIG. 1.

FIG. 6 is a waveshape diagram for the push-pull embodiment of the regulator of FIG. 5.

FIG. 7 is a typical B-H curve for the embodiment of FIG. 5.

DESCRIPTION OF THE PREFERRED EMBODIMENT

Figure 1:
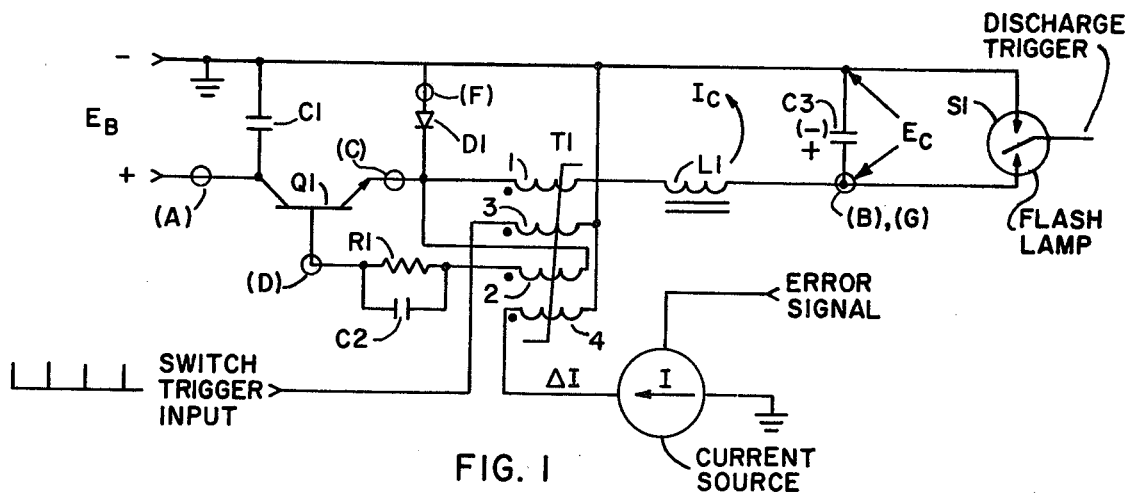
FIG. 1 is a schematic drawing of a preferred embodiment of the switching regulator with a capacitive load.
Figure 2:
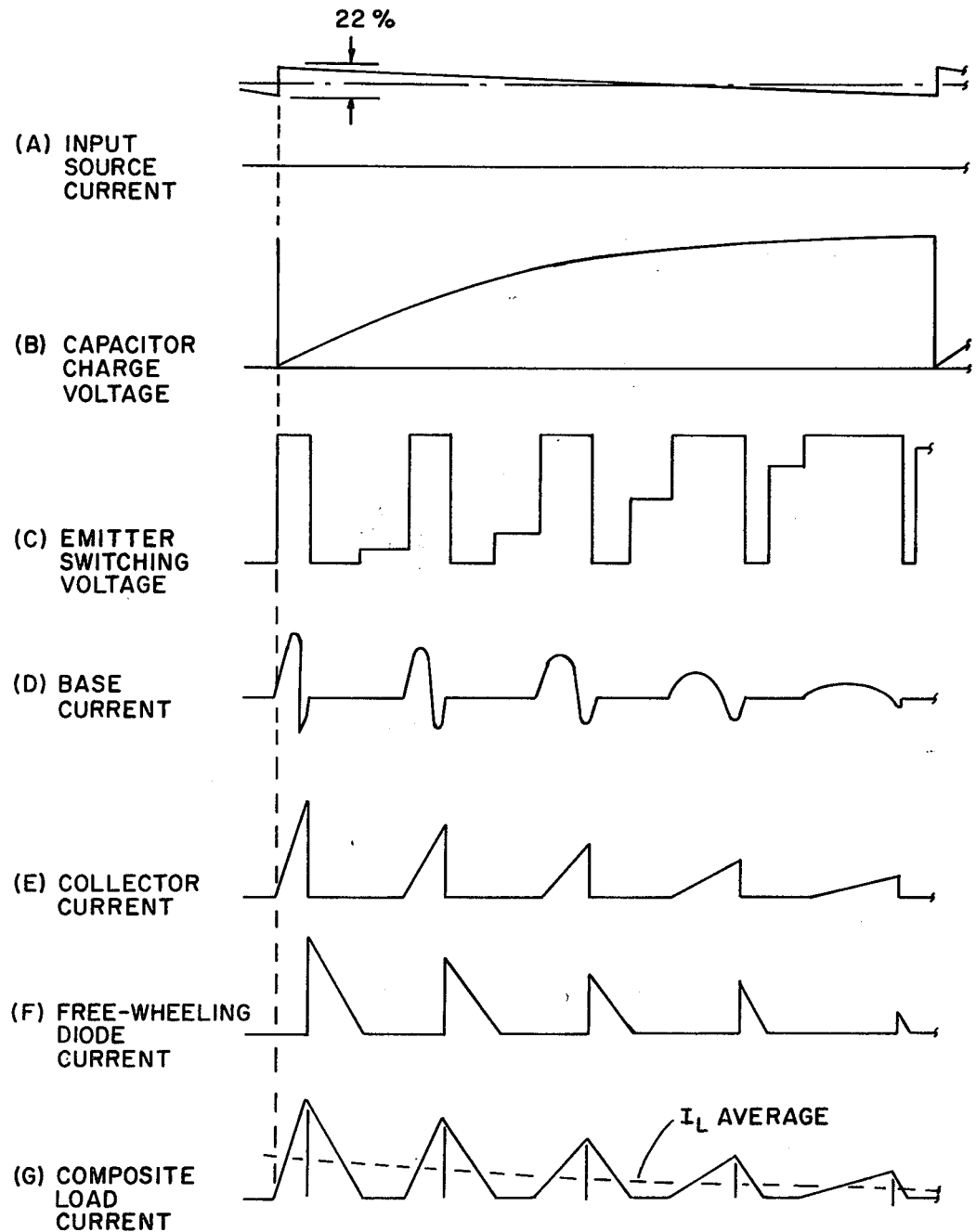
FIG. 2 is a waveshape diagram of the voltages and currents at various points in the embodiment of FIG. 1 during a typical charging cycle.

In operation of the embodiment of FIG. 1 and with reference to FIGS. 1 and 2, initially capacitor C3 has zero voltage ($E_c$) across it. Upon application of a first input trigger pulse applied to winding 3 of transformer T1, the base to emitter junction of transistor Q1 is caused to be forward biased. This action causes Q1 to conduct thereby establishing current flow Ic from the source voltage ($E_B$) through Q1, winding 1 of transformer T1, inductor L1, and capacitor C3. Current flow through winding 1 of transformer T1 causes voltage to be induced in winding 2 of T1 by virtue of magnetic induction. The polarity of this induced voltage is such as to sustain conduction of Q1 (positive feedback). This regenerative action continues until the core of T1 saturates.

When core saturation occurs the magnetic induction causing a positive voltage to appear at the base of transistor Q1 ceases, causing Q1 to turn off. At this time the magnetic field around inductor L1 collapses which causes its instantaneous voltage to reverse polarity resulting in the cathode of diode D1 going negative with respect to its anode. This causes current to continue to flow in the same direction as that of Ic. This current flow thereby transfers the stored energy ($L\, Ic^2/2$) of inductor L1 to capacitor C3. At the completion of this transfer, the circuit returns to a quiescent state. Capacitor C3 now has a voltage stored on it. Inductor L1 restricts the peak current flowing through transistor Q1 to minimize the charging $I^2R$ loss. The energy stored by L1 while Q1 is conducting depends on the load. The greater the load, the higher the free-wheeling recovery current becomes.

Referring to FIG. 3, the B-H curve for core saturation is shown. Core saturation is defined as that state when an increase of magnetizing force (approximately equal to current Ic) ceases to produce a change of magnetic induction (flux $\phi$). The value of Ic is that average or peak current required to produce a flux change $\phi_s$ on the B-H curve (point zero to point P). The time $\Delta t$ that it takes for this action to occur is equal to the product of the number of turns N on winding 1 of T1 and the flux density divided by the voltage ($\Delta e$) appearing across that winding. The voltage $\Delta e$ is equal to the source voltage $E_B$ minus the voltages that appear across inductor L1 ($\Delta V_L$) and capacitor C1($E_c$).

All succeeding triggered charging cycles are the same as described above. However the charge time becomes progressively more since the winding voltage $\Delta e$ diminishes as capacitor charge voltage $E_c$ increases. The peak current also diminishes as $\Delta t$ increases, while the average current Ic for each charge cycle remains the same. After the first cycle of operation the core of transformer T1 may reset to a new point $O_1$ rather than its initial starting point.

After capacitor C3 is charged up to source voltage $E_B$, switch S1 of the flash lamp is externally triggered which discharges the capacitor through the flash lamp until the drop-out voltage of the flash lamp is reached. A new charge cycle begins after drop-out. Typically, for a laser transmitter, the discharge trigger is supplied by a laser system synchronizer unit (not shown) or other typical momentary trigger pulse for initiating ionization or breakdown of the tube. For a laser application, capacitor C3 is normally in the form of a PFN (pulse forming network). Since the discharge time of a PFN is very short, choke L1 serves to isolate the charge circuit from the discharge circuit when the input triggers to transistor Q1 are continuously supplied.

Control winding 4 of T1 is used for programming the magnetic controller for special purposes such as a closed loop regulator operation. The effect of applying current to control winding 4 is to shift the B-axis of the hysteresis curve as shown in FIG. 3. By applying a constant current value (R) to the control winding, the maximum flux swing is decreased from the value $\phi_s$ to $\Delta\phi$. The time required to saturate the core of transformer T1 with the variable current control $\Delta I$ is now $\Delta t = N\Delta\phi/\Delta e$.

The control input current source I, shown in FIG. 1, may be employed to control the operating point of saturable transformer T1. By this means, the regulator may be controlled by the command of any signal so programmed. Thus power regulaton may be employed for a flat response over a large variation of input voltage-or if so desired, a closed-loop regulator as referenced to the load may be completed by including a gain stage between the output and the error signal input of the control winding.

Figure 4:
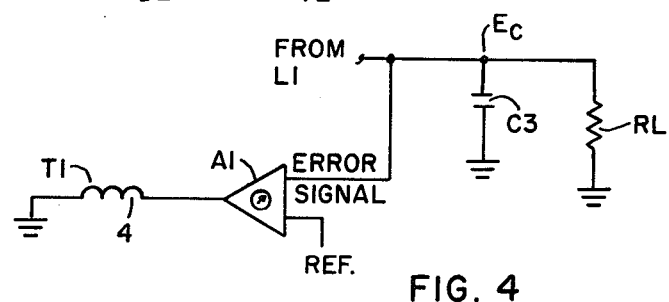
FIG. 4 is a partial schematic diagram of a control winding coupled into the circuit of FIG. 1.

Therefore the control current may be used as a modulation function to control the area of operation T1 on the hysteresis curve. FIG. 4 shows such an application. When the voltage Ec must be set at some value less than $E_B$, the closed loop shown in FIG. 4 may be employed. Current amplifier A1 provides the current source for winding 4 of T1. An error signal input is coupled to A1 from C3 and varies according to the voltage $E_c$ applied to C3. This error signal is compared with a biasing reference signal in A1. When the voltage $E_c$ reaches the reference voltage of amplifier A1, the core of transformer T1 is biased to saturation by the output of A1. A resistive load $R_L$ rather than a pulse load may be used, as shown in FIG. 4.

The capacitor C1 of FIG. 1 smooths the input current into a flat flow regardless of the duty variations of the switching transistor. If the capacitor is preceded by a very stiff supply, it would be necessary to isolate said capacitor from the supply with a choke of such size to fulfill the design criteria for the specific ripple current specified. The higher the switching-rate, (shorter the pulse width) the smaller the size the choke becomes. Thus, for 50–500 kHz, operation, this is hardly a consideration.

One of the most severe load conditions for maintaining high efficiency is that of repetitively charging a capacitive load as is associated with laser flasher PFN's. To minimize the internal loss of the dc supply source it is essential to charge such loads from a constant power supply. When transformer T1 is added to the switching regulator, the composite combination converts the voltage source to a constant power source as referred to load capacitor C3. Transformer T1 provides the positive feedback from the emitter to base circuit to form a boot-strap blocking oscillator whose pulse duration is determined by the saturation limit (volt×time product) of the transformer. The pulse width so formed is biased to be inversely proportional to load current flowing through the primary leg of the transformer. When transformer T1 is triggered at a constant rate, a self-adjusting pulse width switching power-regulator emerges. FIG. 2 shows the waveforms relevant to the operation of the constant power regulator during a charge cycle of load capacitor C3. The voltage and current waveforms present at various points A through G of FIG. 1 are identified by the corresponding letters A-G of FIG. 2 for a typical charging cycle. The voltage charges in accordance with FIG. 2(B) as a result of the composite load current FIG. 2(G). The product of the instantaneous voltage (B) and the instantaneous current (G) is nearly constant over the entire charge cycle. The input power variation is only plus or minus 11 percent (A) over the cycle as is dictated by the open-loop characteristics of the constant power regulator. Composite current (G) consists of collector current (E) and free-wheeling diode current (F). The average collector current during all switching intervals of Q1 are substantially the same, whereas the free-wheeling diode current varies inversely to the capacitor charge voltage.

For conditions of low $V_{CE(SAT)}$ most of the losses in a high frequency switching regulator occur during the full time of the transistor. Here again, the action of the saturable core blocking oscillator is beneficial. When transformer T1 saturates, its stored field collapse causes the base of transistor Q1 to suddenly change from a forward to reverse direction as is indicated by waveforms of FIG. 2(D) at which time capacitor C2 accordingly changes its charged polarity thus back-biasing the base junction for the remainder of the PRF interval. This effect is particularly useful when plural transistors Q1 are operated in cascode. The forced based-to-emitter junction wipeout insures that the turn-off of all series transistors are similar regardless of wide beta variations. This minimizes damage of individual units due to first avalanche normally associated with storage variations inherent in such series operation.

Figure 9:
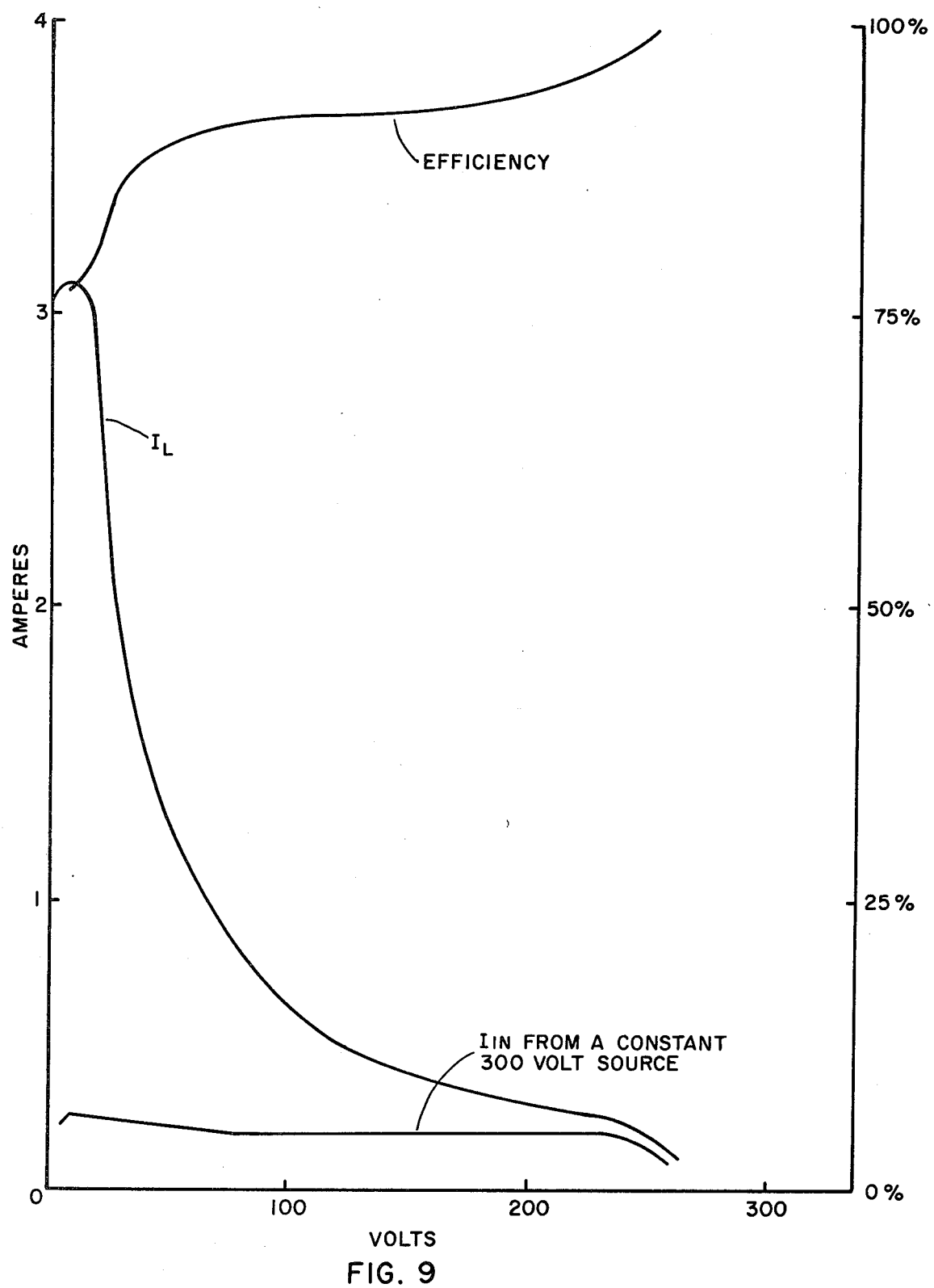
FIG. 9 is an output power efficiency curve for the preferred embodiment of FIG. 1.

FIG. 9 shows pessimistic characteristics of the regulator of FIG. 1 when operated at 10 kHz with a 60-watt load of varying resistance. When the load approaches a short circuit, action of the saturable core causes the pulse width to narrow to the extent to cause regulator dropout. As shown, the nominal efficiency is greater than 90 percent. The measured efficiency of a similar regulator consisting of three transistors operating in cascode approaches 95 to 99 percent when operating into a 100 micro-farad capacitor discharging at a rate corresponding to 120-watts.

Figure 5:
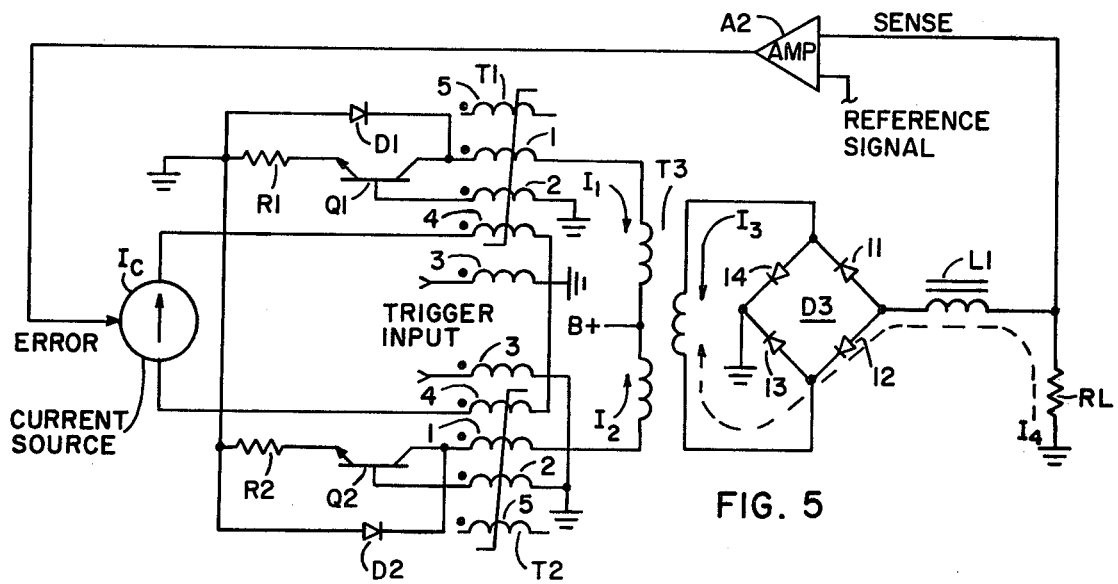
FIG. 5 is an alternative embodiment of the switching regulator with a resistive load.

FIG. 5 discloses two magnetic controlled blocking oscillators operated in push-pull. Amplifier A2, whose output current is the difference between its reference and sense inputs, allows the circuit to be operated as a pulse width controlled inverter regulator. The A2 output provides control current Ic to windings 4 of transformers T1 and T2. The function of these transformers are the same as that described for the embodiment of FIG. 1. In this application, however, the conduction time that either Q1 or Q2 are ON is determined by control current Ic only.

FIG. 6 shows the pertinent waveforms associated with FIG. 5. Base trigger signals supplied to Q1 and Q2 are displaced from each other by ($\Delta t_M$) as shown respectively at (A) and (A') of FIG. 6. $\Delta t_M$ is the maximum time either Q1 or Q2 may remain on without causing switch-through (when both transistors conduct at the same time). $\Delta t_M$ also equals $N\Delta\phi_M/\Delta e$. Since N and e are constants, $\Delta t_{MAX}$ must correspond to zero control current on the B-H loop. To insure that the on time is somewhat less than $\Delta t_M$ the small amount of Ic is applied to control winding 4 of transformers T1 and T2. Based on these factors, alternate collector voltage waveforms (B) and (B') of FIG. 6 evolve at the collectors of Q1 and Q2 respectively when the triggers are applied to those transistors. The collector currents I1 and I2 resulting from said switching action is transformed via transformer T3 to the secondary winding where the pulse voltages are rectified by diode quad D3. These currents I3 and I4 through load resistor RL are always in the same direction to provide a negative voltage at the load in respect to ground. Thus, for example, when Q2 is conducting I2 into the primary of T3, the current I4 transformed into the secondary flows in a loop from ground through R1, L1, diode 12, the secondary of T3, diode 14 and back to ground. Similarly, when Q1 is conducting I3 flows through R1, L1, diode 11, the secondary of T3 and diode 13 to ground. The load current waveform (C) shows the nature of these currents. The shaded area of these waveforms represents the current flowing as a result of the stored charge in inductor L1 at periods when transistors Q1 and Q2 are not conducting. In this case quadature diodes D3 serve as the free-wheeling device.

As indicated in the B-H loop of FIG. 7, the magnitude of control current Ic may be used to vary $\Delta\phi$ from some maximum value, corresponding to $\Delta\phi_M$ to zero, which represents $\Delta$tm to zero pulse width. When the control current is zero, the flux swing goes from point (O) to point (P) and back to zero upon reset. If Ic is advanced to some point X, the flux swing will travel only from a corresponding point X' to point (P) and back to point (X') upon reset.

Diodes D1 and D2 coupled across the respective emitter-collectr leads of Q1 and Q2 are free-wheeling diodes for returning stored charge attributed to the leakage inductance of transformer T3; or if an A-C choke is used in the secondary windings of T3, the D1-D2 free-wheeling current would also include current induced by that stored charge. At full duty, when the volts x time product of the transistor Q1 is not equal to that of Q2, transformer T3 saturates. This places a short across the circuit. But since each blocking oscillator transformer T1 and T2 automatically reduces the pulse width with increased current, the output volt-time product is reduced until core saturation is prevented. This results only in a reduction of dynamic range, but no component destruction.

Figure 8:
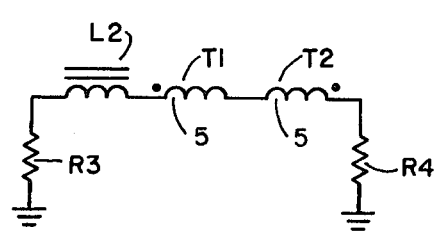
FIG. 8 is a schematic diagram of the control windings of FIG. 5 coupled into the circuit.

As shown in FIG. 8, to insure that the volt x time product remains the same for all pulse width conditions, thus insuring maximum dynamic range, small resistors R3 and R4 are placed to monitor the transistor currents in either side of the inverter. By placing inductor L2 and both windings 5 of transformers T1 and T2 in opposition between resistors R3 and R4 equal complementary currents I1 and I2 will be insured. The purpose of choke L2 in this arrangement is to provide pulse isolation via inductive reactance between the windings and resistors R3 and R4. If the average current through resistor R3 is greater than that of R4, a current is caused to flow through windings 5 of transformers T1 and T2. This biasing action causes the pulse of blocking oscillator Q1 to become shorter and the pulse of blocking oscillator Q2 to become wider until such time as the average current through each transistor is the same. The converse would occur if the average current through R4 was initially greater. This additional feature thus prevents core saturation of transformer T3 throughout the dynamic range of the inverter.

Although a particular embodiment and form of this invention has been illustrated, it is apparent that various modifications and embodiments of the invention may be made by those skilled in the art without departing from the scope and spirit of the foregoing disclosure. Accordingly the scope of the invention should be limited only by the claims appended hereto.

We claim:

1. A constant power regenerative magnetic switching regulator comprising: a transistor, a diode, a transformer having a plurality of windings, a choke, and a load capacitance, said transistor being adapted to receive a collector input voltage signal and being emitter output coupled in series through a first winding of said transformer and said choke to said output capacitance, a circuit common being coupled to said output capacitance to provide a complete charging path therethrough, said diode being coupled between said transistor emitter output and said circuit common, and said transformer being adapted for receiving a switching trigger input signal across a second of said plural windings, said transistor base is coupled through a third of said transformer windings to said emitter diode junction for providing biasing levels to said transistor, a fourth winding of said plural transformer windings is adapted to receive a biasing current signal therethrough, and a current amplifier coupled between the output capacitor and said fourth transformer winding, said current amplifier having a reference signal input for comparing with the signal developed across said output capacitor to provide a variable control signal output to said fourth transformer winding.

2. A constant power regenerative magnetic switching regulator comprising: first and second transformers each having plural windings; a third transformer having a primary winding thereof center tapped for receiving a voltage source input and respective windings thereof coupled to respective first windings of said first and second transformer windings for receiving current flow therefrom; first and second transistors coupled respectively to said transformer first windings and to second windings of respective transformers for providing a current path through said first and second transformers to said third transformer; respective third windings of said first and second transformers being adapted to receive alternately trigger input pulses for stimulating push-pull operation of said switching regulator; a diode bridge, an inductor, and a load being coupled in series across the output winding of said third transformer for providing unidirectional current flow through said load in response to the push-pull operation of respective first and second transformers and respective first and second transistors, thereby controlling the load current flow through said load, and respective control windings of said first and second transformers are coupled in series with an inductive choke and first and second sensing resistors for biasing said transformers.

3. A switching regulator as set forth in claim 2 wherein said diode bridge is coupled between the output secondary of said third transformer and said inductor with the load and inductor coupled across alternative bridge terminals to that of the input transformer secondary.

4. A switching regulator as set forth in claim 2 and further comprising amplifier sensing means coupled between the output load and respective fourth windings of said first and second transformers for providing an error current signal to said transformer windings, thereby biasing the operating point of said transistor-transformer circuits.

5. The switching regulator as set forth in claim 4 wherein said amplifier means comprises a current amplifier having first and second inputs and an output and an adjustable current source, said current source being adapted for circulating a known biasing current through said fourth windings of said first and second transformers, the output of said amplifier providing an error input for adjusting the current flow of said current source, a first input of said amplifier providing a reference signal level input, and second input of said amplifier being coupled from across said load for combining in said amplifier with said reference signal level to control the output level signal.

* * * * *